United States Patent Office 2,932,990
Patented Apr. 19, 1960

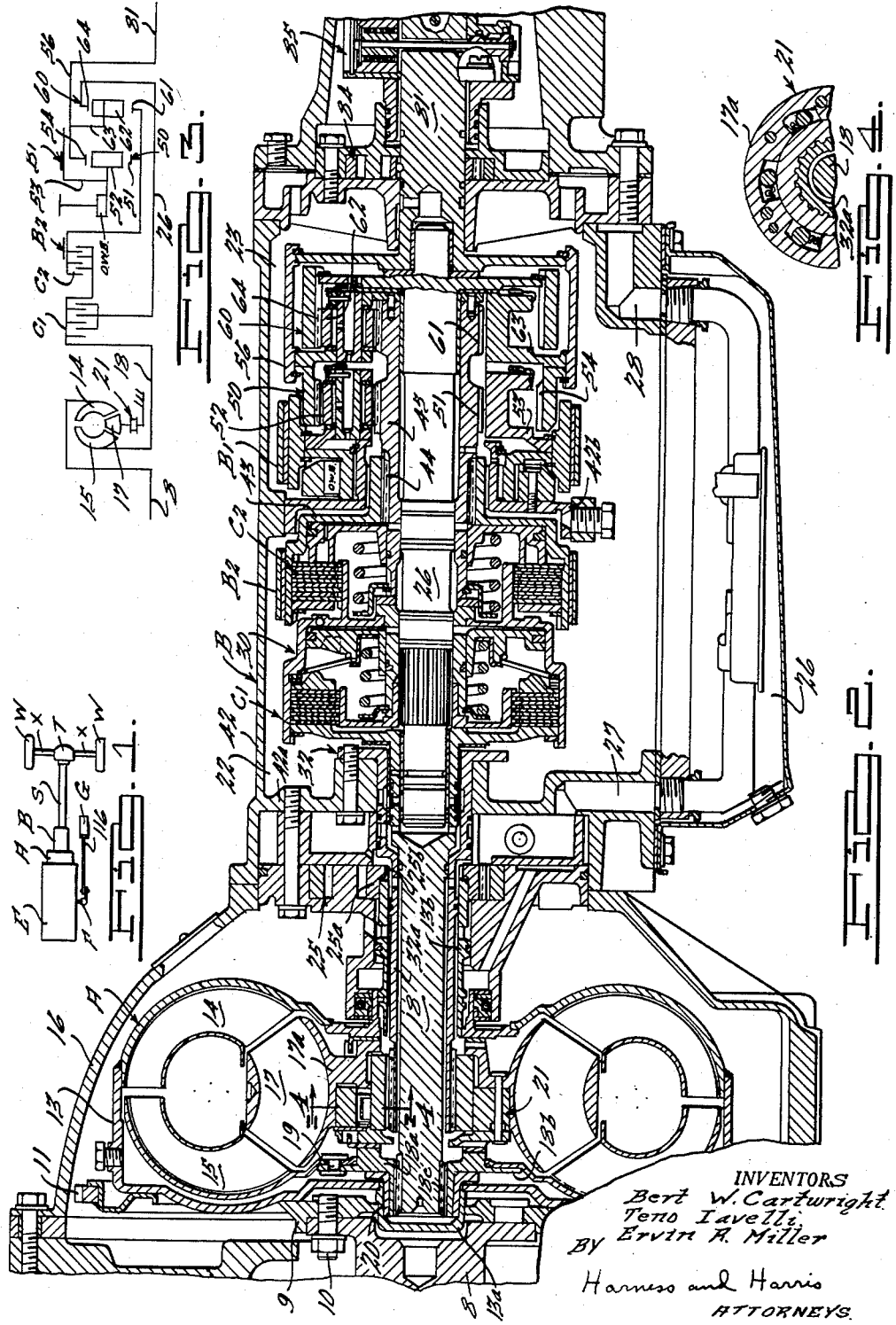

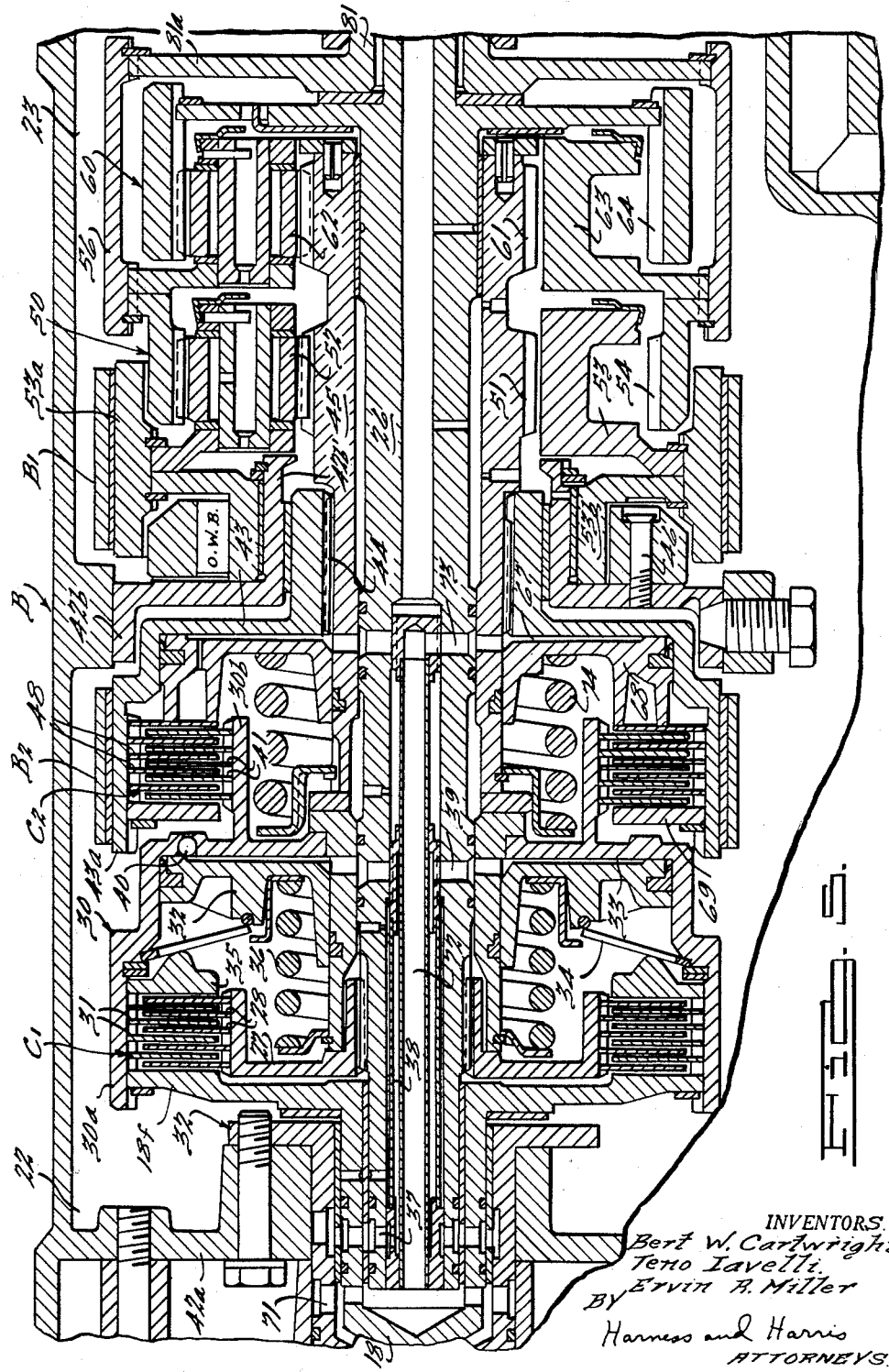

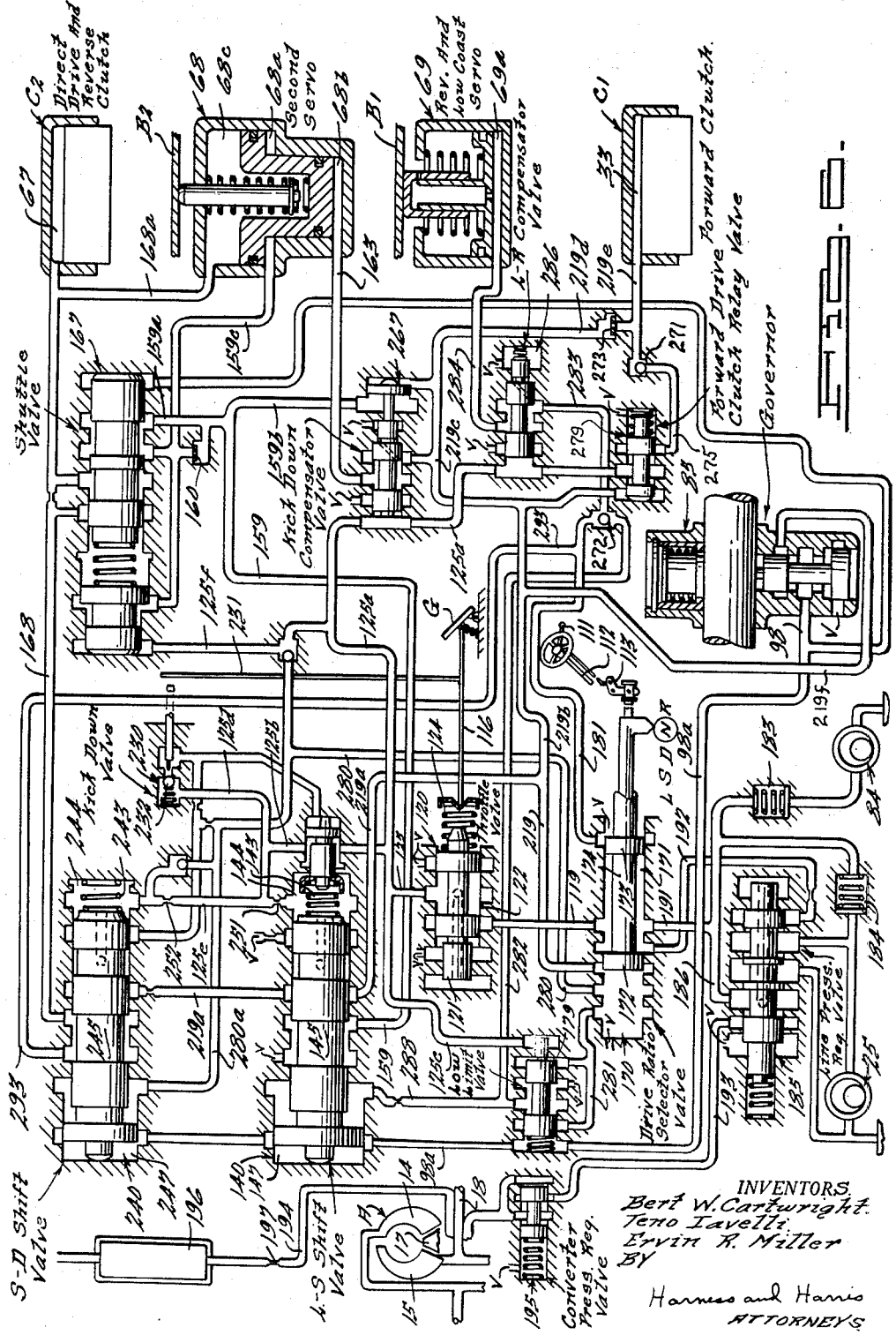

2,932,990
TRANSMISSION

Bert W. Cartwright, East Detroit, and Teno Iavelli and Ervin R. Miller, Detroit, Mich., assignors to Chrysler Corporation, Highland Park, Mich., a corporation of Delaware Application October 14, 1954, Serial No. 462,212

2 Claims. (Cl. 74—763)

This invention relates to a power transmission unit primarily intended for motor vehicle use and is particularly adapted for a transmission of the automatic type that will provide three (3) forward drive speeds and a reverse drive.

It is a primary object of this invention to provide a three forward speeds and reverse drive transmission that utilizes the minimum number and the least complicated transmission elements with said elements arranged in a novel manner so as to provide the most favorable construction for a smoothly operating, automatic transmission control system.

It is another object of this invention to provide a simplified three forward speeds and reverse drive transmission adapted for automatic and manual control that utilizes a pair of simple planetary gear sets in combination with a one-way brake and a pair of friction clutches.

It is a further object of this invention to provide a three forward speeds and reverse gear box having forward and aft compartments separated by an intermediate casing partition that supports the gear box shafting at its point of maximum deflection, said partition being arranged to also provide the reaction support for the braking forces applied to the several planetary gear trains during activation thereof.

It is still a further object of this invention to provide a gear box of the described type wherein the speeds of the various elements are kept to a minimum and the elements are arranged such that they may be easily and cheaply manufactured, assembled and serviced.

It is still another object of this invention to provide a transmission of this type wherein the maximum number of elements are interchangeable so that the number of different transmission parts is kept to a minimum.

Other objects and advantages of this invention will become readily apparent from a consideration of the subsequent description and the related drawings wherein:

Fig. 1 is a schematic view of a motor vehicle drive train that includes a power transmission unit embodying this invention;

Fig. 2 is a sectional elevational view of the power transmission unit utilized in the disclosed drive train of Fig. 1;

Fig. 3 is a schematic line diagram of the power transmission unit shown in Fig. 2;

Fig. 4 is an enlarged, fragmentary sectional, elevational view of the one-way brake mechanism associated with the guide wheel of the drive train torque converter device, the view being taken on the line 4—4 of Fig. 2;

Fig. 5 is an enlarged, sectional elevational view of the gear box used in this power transmission unit; and Fig. 6 is a diagrammatic view of the hydraulically operated control system for this power transmission unit when the control valving thereof is set for neutral and the throttle valve is closed or in engine idle position.

Fig. 1 of the drawings diagrammatically discloses a motor vehicle power plant and drive train comprising an internal combustion engine E drivingly connected to a power transmission unit that consists of the hydrokinetic type of torque converter device A drivingly connected to a change speed gear box B. The output from gear box B drives a propeller shaft or drive shaft S that transmits drive through a differential unit T and axles X to the rear driving wheels W of the vehicle.

Fig. 2 of the drawings discloses the power transmission unit structure that consists of the hydrokinetic torque converter device A and the change speed gear box B that are arranged in a series connected drive transmitting relationship. The reference numeral 8 represents an end portion of a driving member, such as the crankshaft of the engine E of the motor vehicle power plant. The shaft 8 is drivingly connected to the drive transmitting ring 9 by the screw means 10. The drive transmitting ring 9 is drivingly connected to the torque converter casing 13. The converter casing 13 has an engine starter ring gear 11 mounted on and extending about its periphery. Within the torque converter casing 13 are mounted the several vaned converter wheel elements, namely, the impeller or pump member 14, the turbine or runner member 15, and the guide or reaction member 17. A pair of guide wheels may be used in place of the single guide wheel 17.

The vaned impeller wheel 14 is formed as an integral part of the converter casing 13 and is accordingly adapted to be rotatably driven by the driving shaft 8. The vaned turbine wheel 15 is drivingly connected by rivet means 19 to a radially extending flange portion 18b formed on a shaft hub member 18a. Shaft hub member 18a is drivingly connected by splines 18c to the forward end portion of the torque converter driven shaft member 18.

The converter driven shaft member 18 is adapted to transmit drive from the turbine member 15 of the torque converter device A to the planetary gearing of the gear box unit B that is arranged rearwardly of and in series with the torque converter device A. The converter driven shaft 18 thus provides the input shaft to the gear box B. The forward end of shaft 18 is journalled in a bearing 20 that is piloted in an axially extending seat 13a formed in the hub of the torque converter casing 13. The rear end portion of converter driven shaft 18 is rotatably supported by the sleeve plate 32 carried by the front wall 42a of the gear box housing 42.

The vaned converter guide wheel 17 is rotatably mounted within the converter casing 13 by means of the guide wheel hub portion 17a. Guide wheel hub portion 17a is supported by means of the one-way brake device 21, on the axially extending sleeve portion 32a of the anchored sleeve plate 32. The one-way brake 21 (see Fig. 4) is arranged such that it will permit only forward rotary movement (clockwise when looking from the converter A towards the gear box B) to be transmitted to the guide wheel 17 by the forward rotation of the impeller 14. The brake 21 continuously prevents rotation of the guide wheel 17 in a reverse or counterclockwise direction. The specific one-way brake 21 herein disclosed is shown in section in Fig. 4.

The torque converter unit A includes a gear type oil pump 25 having a driving gear 25a that is directly connected by key means 25b to the rearwardly projecting end of an axially extending, sleeve-like, flange portion 13b of the rotatable converter casing 13. The pump 25 draws oil from a supply sump 26' through supply conduit 27' and circulates this oil through the converter A, the transmission unit lubricating system and the various hydraulically operated control mechanisms associated with this power transmission unit (see Fig. 6). A second pump 84, driven by the transmission output shaft 81, is also included in this transmission unit. The second pump 84 provides a second source of pressure fluid for operation of the various aforementioned hydraulically operated devices and insures a pressure fluid supply even at times when the engine driven pump 25 might not be operating. Pump 84 will thus provide pressurized fluid during pushed or towed starting as well as during engine driven operation of the vehicle. Pump 84 is connected to the oil supply sump 26' by the conduit 28'.

The gear box B includes the forward drive clutch $C_1$, the direct drive clutch $C_2$, and the pair of planetary gear trains 50 and 60 that are adapted to cooperate with the torque converter device A to provide means for the transmission of three forward drives and a reverse drive to the propeller shaft S. The forward drive clutch $C_1$ is engaged whenever any of the three forward speeds is being utilized and it is disengaged when the transmission controls are set for either Neutral or Reverse. The direct drive clutch $C_2$ is engaged only when the 3rd or Direct forward speed is being transmitted or when Reverse drive is being transmitted. The different clutches and brakes that are applied for transmitting the several drive ratios obtainable with this transmission are set forth in the chart below:

| Drive Ratio | Members Applied |
| --- | --- |
| Low (1st) | $C_1$ and $B_1$ or O. W. B. |
| Kickdown (2nd) | $C_1$ and $B_2$. |
| Direct (3rd) | $C_1$ and $C_2$. |
| Reverse | $C_2$ and $B_1$. |

The gear box B is enclosed by the housing 42 which includes a front compartment 22 and a rear compartment 23 which compartments are separated by the centrally located housing partition 42b.

In the front compartment 22 are located the clutches $C_1$ and $C_2$ whereas the rear compartment 23 houses the two planetary gear sets 50 and 60. The rear end of the converter driven gear box input shaft 18 pilots the forward end of the gear box intermediate shaft 26. Shaft 26 has its rear end portion piloted in the forward end of the transmission output shaft 81. Transmission shaft 26 drivingly mounts a spider element 27 at its forward end. The spider element 27 carries the clutch disc elements 28 that form a part of the forward drive clutch $C_1$. Transmission shaft 26 also drivingly mounts a planetary ring gear element 64 at its rear end. The ring gear element 64 provides the drive input element to the planetary gear sets 50 and/or 60 when the transmission is set for any of the forward drive ratios, as will subsequently become apparent.

The rear end of the converter driven gear box input shaft 18 carries a radially extending flange 18f to which is drivingly mounted the clutch drum element 30. Portion 30a of the drum 30 drivingly mounts the clutch discs 31 that are adapted to be drivingly engaged with the aforementioned clutch discs 28 carried by the transmission shaft 26. Clutch discs 28, 31 are arranged to be engaged by the forward movement of the piston 32 upon the admission of pressurized fluid to the drum carried cylinder bore 33. The clutch engaging forward movement of the piston 32 is transmitted to the clutch discs 28, 31 by the rockable lever ring 34 and the reciprocable pressure plate 35. Compression spring 36 normally urges the piston 32 rearwardly to a clutch disengaged position. Pressure fluid for causing the engagement of forward drive clutch $C_1$ is supplied to the cylinder 33 by way of connected conduits 37, 38, 39. Clutch cylinder 33 includes a well-known type of pressure fluid relief valve 40 to prevent unintended engagement of clutch $C_1$. It is thought to be apparent from the foregoing description that when forward drive clutch $C_1$ is engaged then drive is transmitted directly from the torque converter driven shaft 18 to the gear box shaft 26 and to the ring gear element 64 of the rearwardly located planetary gear set 60.

Mounted on the rearwardly projecting, axially extending, flange 30b of the drum element 30 are a set of clutch discs 41. Clutch discs 41 form a part of the direct drive and reverse drive clutch $C_2$. Discs 41 are arranged so as to be drivingly engaged with the clutch discs 48 by means that is subsequently described in detail.

Clutch discs 48 are drivingly mounted on the axially extending outer flange 43a of drum element 43. The centrally located hub portion of the drum element 43 is drivingly connected by splines 44 to the hollow shaft 45. Hollow shaft 45, which is journalled on the gear box shaft 26, has formed thereon a pair of axially spaced apart sun gears 51 and 61 respectively. Sun gear 51, which is an element of the forwardly located planetary gear set 50, is meshingly engaged with planetary pinion gears 52 (only one shown) that are rotatably mounted on the planet pinion carrier 53. Planet pinion carrier 53 has a peripheral rim 53a that is adapted to be engaged by the braking band $B_1$ when either two-way Low (1st) forward drive or Reverse drive is to be transmitted. Also drivingly connected to the planet pinion carrier 53 is a flanged collar 53b. Collar 53b has its hub portion journalled on the axially extending sleeve portion 42b' of the gear box housing central partition 42b. Fixed to the gear box housing partition 42b by the bolt means 46 is a roller type one-way brake device O.W.B. The one-way brake device O.W.B. is arranged to prevent reverse rotation (counterclockwise when looking from converter A towards gear box B) of the planet pinion carrier 53. The one-way brake O.W.B. provides the reaction for the compounded gear sets 50, 60 so as to provide a one-way Low (1st) speed drive as will be apparent from the subsequent description. The planet pinion gears 52 meshingly engage with the ring gear 54. Ring gear 54 is drivingly connected to a drum element 56 that in turn is drivingly connected to the radially extending flange 81a of the gear box output shaft 81. The ring gear 54 and the connected elements 56, 81a thus provide the means for transmitting torque from the planetary gear set 50 to the output shaft 81.

The sun gear 61, on the rear end of hollow shaft 45, meshingly engages the planet pinion gears 62 (only one shown) that are rotatably mounted on the pinion gear carrier 63. Planet pinion gear carrier 63 is drivingly mounted on the drum element 56 that is fixedly connected to the gear box output shaft 81. Planet pinion gear carrier 63 and the connected elements 56, 81a thus provide the means for transmitting torque from the planetary gear set 60 to the output shaft 81. The planetary gear set 60 can be activated to transmit a two-way kickdown (2nd) speed drive by the engagement of the braking band $B_2$ with the flange portion 43a of the drum element 43. Braking of drum 43 will anchor the sun gears 51 and 61 and then sun gear 61 will provide the reaction for the kickdown (2nd) speed forward drive transmitted through the gear set 60 from ring gear 64 to planet pinions 62 to the driven pinion gear carrier 63 carried by the output shaft 81.

As aforementioned, the direct drive and Reverse drive clutch $C_2$ comprises the clutch discs 41 and 48. Clutch discs 41 and 48 are mounted within the drum element 43 that provides a cylinder bore 67 for the clutch actuating piston 68. Application of pressurized fluid to the cylinder bore 67 causes forward movement of the piston 68 to a clutch engaging position. On forward movement of the piston 68 the discs 41, 48 are compressed between the piston 68 and the backing plate 69 that is anchored to the flange 43a of the drum element 43. Pressurized fluid for causing engagement of the clutch $C_2$ is supplied to the cylinder bore 67 through the connected conduits 71, 72, 73. The control system for the several braking bands and clutches and other pressure fluid operated devices associated with this transmission is schematically shown in Fig. 6 and subsequently described. Whereas pressurized fluid is used to move the clutch piston 68 forwardly to a clutch engaging position, the compression spring 74 is provided to continuously exert a force on the piston 68 tending to move it rearwardly to a clutch disengaged position.

Mounted on the transmission output shaft 81, rearwardly of the pump 84, is an output shaft speed responsive governor 85. Governor 85 is of the hydraulic type that provides a source of pressurized fluid having a variable pressure that is substantially proportional to the speed of the output shaft 81. The construction of the governor mechanism 85 is shown in detail in U.S. Patent No. 2,697,363 to W. L. Sheppard dated December 21, 1954. Obviously other types of governors could be used to provide a vehicle speed responsive control for the control system of this transmission.

With the aforedescribed gear box when the transmission is set in Neutral the hydraulic control system shown in Fig. 6 prevents the application of pressurized fluid to either of the clutches $C_1$, or $C_2$ or to either of the servos 68 and 69 that are used to apply the braking bands $B_1$ and $B_2$. When clutch $C_1$ is disengaged, the torque converter driven gear box input shaft 18 is disconnected from the gear box intermediate shaft 26 so there can be no input to the gearing from ring gear 64. When the clutch $C_2$ is disengaged there can be no drive input to either of the gear sets 50, 60 through the sun gears 51, 61 of the gear sets.

When the drive ratio selector lever 111 (see Fig. 6) is set for the initiation of drive in the Drive ratio the forward drive clutch $C_1$, is automatically engaged and this transmits drive to the gear box intermediate shaft 26 that carries the planetary input gear 64. Neither of the braking bands $B_1$ or $B_2$ nor the clutch $C_2$ is engaged at this time. The one-way brake O.W.B. prevents reverse rotation of the carrier 53 at this time and this brake device provides the reaction for the compounded gear sets 50 and 60 which cooperate to transmit the Low speed reduction drive to the gear box output shaft 81. This Low speed drive passes from the input shaft 18 to the transmission intermediate shaft 26 and then to the ring gear 64. Ring gear 64 acts on the planet pinion gears 63 and causes rotation of the sun gear 61 backwards because the load on the output shaft 81 tends to anchor the planet pinion carrier 63 against rotation. Rotation of sun gear 61 backwards rotates the shaft 45 and the sun gear 51 backwards. The sun gear 51 rotating backwards acts on the planet pinions 52 and tends to rotate the pinion gear carrier 53 backwards because of the output shaft load on the ring gear 54. Due to the one-way brake device O.W.B. the carrier 53 can not be rotated backwards and the pinion gears 52 drive the ring gear 54 and connected output shaft 81 forwardly. Due to the connection of both the carrier 63 and the ring gear 54 to the output shaft 81 and due to the anchoring of carrier 53 by brake O.W.B. at this time, part of the input shaft torque is transmitted directly to the output shaft 81 by the planetary gear set 60 and the other part of the input shaft torque is delivered to the output shaft 81 through the compounded gear sets 50 and 60. The starting Low drive when the transmission is set for Drive, or any other forward drive ratio for that matter, thus passes through both of the gear sets 50 and 60 with the reaction normally provided by the one-way brake device O.W.B.

When Second speed is to be attained by an upshift from the starting Low, it is merely necessary to apply braking band $B_2$ while forward drive clutch $C_1$ remains engaged. This anchors the rotatable shaft 45 that carries the sun gears 51 and 61. With sun gear 61 anchored the planetary gear set 60 is activated to directly transmit a Second speed drive from ring gear 64 to pinions 62 to the output shaft 81 by way of the carrier 63. Planetary gear set 50 is inactive at this time and its pinion gear carrier 53 is driven forwardly at a speed which causes it to over-run the one-way brake device O.W.B. Braking band $B_1$ and clutch $C_2$ are disengaged when the transmission is conditioned for Second. It will be noted that no braking band need be released on an upshift from Low to Second because the Second speed can lift off the one-way brake O.W.B. when band $B_2$ is applied and likewise no braking band need be applied on an automatic downshift from Second to Low for the drive can drop down on to the one-way brake device O.W.B. as the band $B_2$ is released.

Third forward speed or direct drive is achieved by an upshift from Second that results from the simultaneous engagement of the drive drive clutch $C_2$ as the band $B_2$ is released. The forward drive clutch $C_1$ remains engaged when in Third speed while bands $B_1$ and $B_2$ are released. Engagement of clutch $C_2$ while clutch $C_1$ is engaged connects the ring gear 64 and the sun gear 61 of the planetary gear set 60 and this locks up the gear set 60 for the transmission of a direct 1:1 forward drive. Locking up gear set 60 also locks up gear set 50 because of the interconnection between the several elements of these two gear sets.

Reverse drive is obtained by engaging the clutch $C_2$ and applying the brake band $B_1$ while the clutch $C_1$ is disengaged and the braking band $B_1$ is released. With clutch $C_1$ disengaged there is no drive input to the transmission intermediate shaft 26 or to the ring gear 64. Drive input is from the input shaft 18 through the clutch $C_2$ to the sun gear 51. As braking band $B_2$ is applied the carrier 53 is anchored and the output shaft mounted ring gear 54 is driven in a backwards or reverse direction by the gear set 50. Planetary 50 is thus effective to directly transmit the Reverse drive.

For a coasting Low speed ratio for use as a brake, the braking band $B_1$ can be applied at the same time that the forward drive clutch $C_1$ is engaged by movement of the selector lever 111 to Low position and this will produce an effective coast brake. The one-way brake O.W.B. can not be used for a coast brake in Low speed because it would permit carrier 53 to overrun.

A hydraulic control system for the hereinbefore described transmission is shown diagrammatically in Fig. 6. This control system includes the vehicle speed responsive hydraulic governor 85 that is mounted on the gear box output shaft 81. In addition to the vehicle speed responsive control unit 85, some form of torque regulating or torque responsive control such as a valve operated by the engine accelerator pedal G is included in this transmission control system so as to provide both speed and torque responsive control mechanisms to control operation of the transmission.

It is proposed to have suitable hydraulic controls for this transmission so as to provide a fully automatic three forward speeds gear box in addition to providing means for selectively locking the transmission in either of the two forward underdrive ratios and reverse drive.

The control system (see Fig. 6) for this transmission includes the manually operable drive ratio selector lever 111 which is rotatably mounted on the conventional motor vehicle steering column 112. Control lever 111 is connected by suitable linkage 113 to the manually operable drive ratio selector valve 170. Drive ratio selector valve 170 has five drive ratio positions which are represented in the drawings by the letters R, N, D, S and L respectively. These letters correspond to the Reverse, Neutral, Drive, Second and Low ratios which are selectively obtainable by manual shift of selector lever 111. The letter V associated with the valve units 120, 170 and with the other valve units of this control system, denotes a vent or drain port for returning the control system pressure fluid to the fluid supply sump 26.

Pressure fluid from either of the supply pumps 25 or 84 is directed into the main supply conduit 191 which is connected to the manually operable drive ratio selector valve 170. The pressure of the fluid in supply conduit 191 is controlled by the pressure regulator valve 185 and this controlled pressure fluid supplied to valve 170 is denoted "line" pressure (normally about 90 p.s.i.) for purposes of description hereafter. Check valves 183 and 184 maintain a closed pressure fluid supply system. On admission of "line" pressure fluid to the bore 171 of drive ratio selector valve 170 certain of the control mechanisms associated with the control system will be energized and one or the other of the several aforementioned drive ratios will be established. When the manual valve 170 is located in the Neutral position the valve lands 172 and 173 of plunger or spool type valve element 174 close off the escape of pressurized line fluid from valve bore 171 except through conduit 192 that leads to the pressure regulator valve 185. Thus "line" pressure fluid cannot pass from supply conduit 191 through valve 170 to activate any of the drive ratio control mechanisms. However, it should be noted that when the manually controlled valve 170 is placed in the Neutral position with the vehicle engine running, or when the vehicle is being pushed or towed so that one or the other of pumps 25 or 84 is operating, "line" pressure fluid from one or the other of pumps 25, 84 can still be directed through conduits 192 and 186 to the "line" pressure regulator valve 185 and through valve 185 to the conduit 193 that supplies pressure fluid to the converter A. Conduit 193 may contain a converter fluid pressure regulator valve 195 to control the pressure of the fluid directed into the converter A. Pressure fluid passing through converter A is passed on to the pressurized transmission lubrication system and to the sump 26 by the conduit 194. Conduit 194 may have associated therewith a flow restriction 197 and in some cases a converter fluid cooling unit 196. The converter pressure regulator valve 195 may be set to maintain a pressure of approximately 55 to 60 p.s.i. in the converter at all times.

In either of the forward drive ratio positions D or S or L of the drive ratio selector valve element 174, "line" pressure fluid from supply conduit 191 will always be directed through the bore 171 of valve unit 170 and into the conduit 119 that connects the manual drive ratio selector valve unit 170 with the torque control or torque regulating throttle valve unit 120. Consequently a form of torque responsive control is always available to cooperate with the driven shaft speed responsive governor 85 to conjointly control automatic operation of this transmission unit in all forward drive ratios. "Line" pressure passed to conduit 119, whenever the ratio selector valve 170 is set for a start in either Drive, Second or Low ratio, also is passed by conduits 219, 219a to the Low to Second shift valve 140 and to the Second to Direct shift valve 240. It will be noted that the conduit 219 has branch conduits 219b–219e connected thereto to divert pressurized "line" pressure fluid to the bore portion 33 of the forward drive clutch $C_1$. "Line" pressure admitted to bore portion 33 of clutch $C_1$ engages the forward drive clutch $C_1$ and conditions the transmission for any of the three forward speeds. It will be remembered that one-way brake O.W.B is continually applied to the carrier 53 of planetary gear set 50. Thus the planetary gear trains 50, 60 are initially activated for the Low forward underdrive whenever valve unit 170 is set for a starting drive in either Drive or Second or Low, that is, all starts forwardly will be through the Low underdrive initially.

The torque responsive throttle valve unit 120 has operably associated therewith through linkage 231 a kick-down valve-controlled mechanism 230 that is hereinafter described. The torque responsive throttle valve 120 is operated by linkage 116 connected to the throttle control or accelerator pedal G for the engine carburetor F. The spool type throttle valve element 121 of valve unit 120 is arranged to be reciprocated by oscillation of the linkage 116. Throttle valve element 121 is arranged to reciprocate in the bore 122 of the valve unit 120 and it is connected to the actuating linkage 116 through a compression spring 124. At closed or idle throttle position of the accelerator pedal G with the manual control valve 170 set for either of the forward drive ratios D, S or L, the arrangement of the plunger valve 121 in the bore 122 of valve 120 is such as to permit some pressurized fluid to flow from the supply conduit 119 through valve bore 122 of valve 120 and into the conduit 125 and its branch conduits 125a, 125b, 125c, 125d, 125e and 125f. The pressure of the fluid passing out of valve 120 into conduit 125 may be lower than that of the "line" pressure supplied to valve 120 by conduit 119 due to the reducing valve action of valve 121. This reduced or compensated "line" pressure supplied to conduits 125, 125a–125f is denoted "throttle" pressure hereafter.

Admission of "throttle" pressure to the branch conduit 125b permits this throttle responsive pressurized fluid to be passed to the conduit 125e that includes the restriction orifices 251 and 252 respectively. Conduit 125e provides the "throttle" pressure supply to the bores of valves 140 and 240. "Throttle" pressure fluid passed through conduit 125e to the bore chambers 144 and 244 of shift valves 140 and 240 respectively is applied to the right ends of the plunger or spool type valves 145 and 245 of the shift control valve units 140 and 240 respectively whenever the vehicle is at a stop or traveling at relatively low speeds. Under such conditions the valves 145 and 245 will be positioned towards the left ends of their respective valve bores and conduit 125b is then connected to the bore chambers 144, 244 at the right ends of valve units 140, 240. Drive ratio shift control valve units 140 and 240 are differential pressure operated shift valves that automatically effect the speed ratio shifts between Low and Second and Second and Direct respectively. The details and the manner of operation of differential pressure operated control valves of this type are described in the co-pending application of J. T. Ball et al. Serial No. 268,274, filed January 25, 1952, now Patent No. 2,849,889.

"Governor" pressure fluid from the governor output conduit 98 is passed into branch conduit 98a which applies the output shaft speed responsive pressurized fluid to the chambers 147, 247 at the left end of valves 140 and 240. This "governor" pressure in the valve bores at the left end of valve units 140, 240 tends to urge the plunger or spool-type valve elements 145 and 245 towards the right ends of the valve units 140, 240. Thus it will be seen that the pressure differential between the "throttle" pressure fluid and the output shaft speed responsive pressurized fluid, which fluids are applied to opposite ends of valves 145 and 245, effects reciprocating movement of these shift valves within their valve bores. At relatively low output shaft speeds with the throttle valve 121 cracked open by accelerator depression, the "throttle" pressure in conduit 125e is greater than the "governor" pressure in conduit 98a and the valves 145 and 245 are automatically positioned towards the left ends of their valve bores. As the output shaft speed increases a point is reached where the "governor" pressure from conduit 98a exerts a force on the left end of the valves 145 and 245 that overcomes the force of the "throttle" pressure on right ends of the valves 145, 245 and then the shift valves 145 and 245 successively shift towards the right to upshifted positions. This differential pressure generated shift of the shift valves 145 and 245 is utilized to automatically control operation of the direct drive clutch $C_2$ and the servo 68 for the forward drive braking band $B_2$. It should be pointed out that the diameter of the left end area of valve 145 is greater than the diameter of the left end area of valve 245 and thus the same pressurized fluids admitted to the valve units 140, 240 will produce different shift forces and as a result different points are obtainable for the shifts from Low to Second and Second to Direct. Also shift valve 245 must work against a stronger spring 243 than the spring 143 against which the valve 145 works so this raises the Second to Direct upshift point above that of the Low to Second upshift. Upshift of valve 145 may occur from about 9 to 18 m.p.h. while upshift of valve 245 may occur from about 18–68 m.p.h. It is thought to be obvious that the points of shift of the shift control valves will vary considerably depending on the degree of throttle valve opening as compared to the output shaft speed at any given time.

After initiating drive in "Low" the rightward upshift of the Low to Second shift valve 145 will connect the "line" pressure supply conduit 219a through the valve 145 to the conduit 159. Pressurizing conduit 159 will apply "line" pressure to the shuttle valve unit 167 through branch conduit 159a, will apply "line" pressure to kickdown compensator valve unit 267 through branch conduit 159b, and will pass "line" pressure to the "apply" chamber 68a of the Second servo 68 by way of conduit 159c and bleed valve 160. Pressurizing the chamber 68a of Second servo 68 with "line" pressure will apply brake band B$_2$ and activate the planetary gear set 60 for the transmission of the Second speed or kickdown ratio. Due to the branch conduit 159b applying "line" pressure to the kickdown or Second speed compensator valve 267 when the Low to Second shift valve upshifts, the compensator valve 267 applies a compensated "line" pressure to the chamber 68b of Second servo through the conduit 163. This compensated "line" pressure in chamber 68b assists the "line" pressure in chamber 68a in applying the Second speed brake band B$_2$. Thus Second band B$_2$ is applied as the Low drive is lifted off the one-way brake O.W.B. The compensated "line" pressure in chamber 68b is proportional to the torque being transmitted so this pressure varies in proportion to the "throttle" pressure variation. Shuttle valve 167 also participates in controlling the pressure fluid applied to the second speed servo 68 but it is not thought that a description of its functions is necessary for an understanding of the invention claimed herein.

After the upshift from "Low" to "Second" then subsequently the Second to Direct Shift valve 240 will effect an automatic upshift from "Second" to "Direct" by connecting "line" pressure supply conduit 219a through valve 240 to the conduit 168. To accomplish this shift "line" pressure is directed into release chamber 68c of servo 68 by way of conduits 168, 168a so as to effect release of "Second" band B$_2$. At the same time "line" pressure is directed by way of conduit 168 into the clutch apply chamber 67 of clutch C$_2$. Engagement of clutch C$_2$ effects lock up of planetary 60 so as to provide for the transmission of a forward direct drive from shaft 18 to output shaft 81. Automatic downshifts from Direct Second to Low are effected in the reverse manner to that described for the upshifts.

In addition to the automatic downshifts from Direct to Second to Low, it is possible for the transmission operator to overrule the automatic controls and effect a downshift from "Direct" to "Second" at substantially any time he desires by merely fully depressing the accelerator pedal G. Such an accelerator depression will cause linkage 116 to apply linkage 231 to the right end of kickdown valve 230 and shift valve element 232 to the left. Leftward shift of valve 232 when the transmission is operating in "Direct" will bring about an immediate downshift from "Direct" to "Second" due to the application of a pressurized fluid to the right end of the Second to Direct shift valve 245. When valve 245 is kicked down then "line" pressure is supplied to chamber 68a of servo 68 and venting of the bore 67 of clutch C$_2$ occurs. After the kickdown to "Second" the transmission control system will either automatically upshift to "Direct" on release of the depressed accelerator G, or, if the output shaft speed should be dropping, then possibly the control system would automatically downshift to "Low" for a more favorable speed ratio drive in the starting underdrive ratio.

In addition ot the operator effected, accelerator pedal actuated downshift, the transmission operator can also downshift from "Direct" to "Second" or "Low" by manually shifting drive control lever 111 to either the "Second" or "Low" position. This manual shift will lock the transmission in the particularly selected drive ratio and prevent automatic upshifts therefrom. Locking of the transmission in either the "Second" or "Low" ratio is particularly advantageous for coast braking. It might be pointed out that the control system includes valve means 179 connected to the manual control valve unit 170 to limit the top speed at which the manual downshift to "Low" may be accomplished. If the manual shift to "Low" is attempted at too high a speed then the transmission will first downshift to "Second" and thereafter, when the speed has dropped sufficiently, will then downshift to "Low" and remain locked in the preselected "Low" ratio until the control lever 111 is shifted to some other ratio. It should also be pointed out that on the manual downshift to Low, coast servo 69 is activated to provide means to positively hold the planet carrier 53 by the application of the brake band B$_1$. Due to the gear speeds at this time the one-way brake O.W.B. is not operative as a holding means for the planet carrier 53 on a coast downshift so the two-way brake band B$_1$ must be applied. Band B$_1$ is applied by the application of a compensated "line" pressure to servo chamber 69a at this itme. On positioning valve 170 in Low position the conduits 280 and 281 are pressurized with "line" pressure. Conduit 280 transfers "line" pressure through connected conduits 281-283 to the Low and Reverse compensator valve 286 which applies a compensated "line" pressure to the chamber 69a of servo 69 through conduit 284.

Reverse drive is activated by setting the drive control lever 111 in the Reverse position. This causes the hydraulic control system to pass a boosted "line" pressure into the conduit 181 and its connected conduits 283 and 293. The "line" pressure used in Reverse is boosted from the usual 90 p.s.i. available for the forward drive ratios to approximately 225 p.s.i. by the operation of the line pressure regulator valve 185. Conduit 192 is not pressurized when the drive ratio selector valve 170 is set for Reverse and this changes the forces acting on the line pressure regulator valve 185 so that the "line" pressure is approximately 225 p.s.i. when the controls are set for Reverse. A complete description of this line pressure regulator valve is set forth in the co-pending application of W. L. Sheppard, Serial No. 254,531, filed November 2, 1951, now Patent No. 2,740,304. When conduit 181 is pressurized with 225 p.s.i. "line" pressure, the connected conduits 293 and 168 transfer this boosted "line" pressure to the cylinder bore 67 to effect engagement of the clutch C$_2$. At the same time the boosted "line" pressure in conduit 181 is conducted by conduit 283 to the Low and Reverse compensator valve 286 which passes through conduit 284 a compensated variable "line" pressure into the apply chamber 69a of the servo 69 so as to apply the braking band B$_2$. With clutch C$_2$ and band B$_2$ applied a Reverse drive is transmitted from the input shaft 18 through clutch C$_2$, shaft 45, sun gear 51, and anchored carrier 53 to the output shaft mounted ring gear 54.

In addition to the automatically operable three speeds forward drive, available when the drive ratio selector 111 is set in Drive, there is also available an automatically operable two speeds forward drive that is activated when a start is made by placing the drive ratio selector lever 111 in its Second speed position. As was the case with starting in the Drive ratio this second speed forward drive is also initiated in Low due to the one-way brake device O.W.B. being operable. Thereafter the Low-Second shift valve 140 effects an automatic upshift to Second speed when the output shaft speed and the engine throttle conditions dictate such a shift. The transmission can not upshift to the third or direct forward speed when the drive ratio selector lever is set in Second. This is due to the "line" pressure supplied to conduits 280, 280a at the Second setting applying "line" pressure to the right end of the valve bore 247 of valve 240 so as to oppose the force exerted by the upshifting "governor" pressure applied to the left end of the valve bore 247. Automatic shifts between Low and Second speeds will take place when the drive ratio selector lever is set for Second.

If it is desired to lock the transmission in the Low underdrive ratio for a coast drive brake or for rocking the car out of a rut or when it is desired to get the maximum torque for a continuous driving operation, then the drive ratio selector lever 111 can be set in the Low position. "Line" pressure will then be directed by way of conduits 281, 283 and 280a respectively into the right ends of the valve bore portions 147 and 247 of shift valves 140 and 240 respectively. As a result, neither of these shift valves 140 and 240 will be operable to effect automatic upshifts or downshifts in speed ratio drive. Furthermore, with the drive ratio selector lever 111 set in Low the conduit 281 applies "line" pressure to the Low limit valve 179 and this causes "line" pressure to be transferred by connected conduits 282 and 283 to the Low and Reverse compensator valve 286 such that a compensated "line" pressure will be applied to the Low and Reverse servo 69 and the band B, applied. Thus when the drive ratio selector lever 111 is set for Low, a positive two-way drive is provided rather than the one-way Low drive that is operable when the drive ratio selector is set in the other forward drive ratios.

There are other novel features of this transmission control system per se that are being covered by other patent applications on the system. It is not thought that the control system need be described in further detail for an understanding of the invention described and claimed herein.

From the foregoing description of this transmission and a consideration of the related drawings, it is thought to be clear that this transmission provides a compact, rigid, relatively simple, mechanism that uses only two (2) planetary gear sets and two (2) clutches to provide for the transmission of three (3) forward speeds and a reverse drive. Gear and shaft deflection in gear box B is reduced to a minimum by the arrangement of the gear box housing partition 42b midway between the ends of the transmission intermediate shaft 26. Partition 42b not only journals the shafts 45 and 26 but in addition it supports the planet pinion carrier 53 and provides the reaction support for the one-way brake O.W.B. The arrangement of the one-way brake O.W.B. in the gear box B simplifies the gearing and the control system in that normal upshifts from Low to Second or downshifts from Second to Low do not require the application of a low speed brake band to the carrier 53 in order to activate the Low speed gear train. Engagement or release of the Second speed braking band $B_2$ does not have to be timed with respect to the Low speed brake O.W.B. for the brake O.W.B. operates automatically and thus control of the application and release of band $B_2$ is not as critical as it would be in an automatic transmission of this type using a band for anchoring the carrier 53. It is well known that band to band shifts are most difficult to control and because of the use of the one-way brake O.W.B. this transmission eliminates such a shift in its automatic operation. The shift pattern in this transmission is from the one-way brake O.W.B. to the second speed band $B_2$ to the direct drive clutch $C_2$.

In addition to providing a transmission that is particularly adapted for smooth operation, this transmission is also one that is simple and inexpensive because of the arrangement and design of its elements. It will be noted that the same number and the same size clutch plates are used in each of the clutches $C_1$ and $C_2$. Also, the piston bores 33 and 67 of the clutches $C_1$ and $C_2$ are of the same diameter. This permits the use of sealing rings of identical size and design in the two friction clutches. The planetary gear trains 50, 60 each have the several corresponding gears thereof formed with the same number of teeth. Furthermore, the sun gears 51, 61 are identical and integral with the hollow shaft 45 so this facilitates manufacture and assembly. Also, the several planet pinion gears 52, 62 are identical and interchangeable. The ring gears 54 and 64 are of the same diameter and have the same number of teeth so they can be identical parts, if desired, although they are not shown as such in the drawings. The use of a single output shaft mounted member to transmit drive from each of the planetary gear sets 50 and 60 to the output shaft 81 also simplifies the gear box arrangement.

Another feature of this transmission that distinguishes it from certain other known designs of this general type is the arrangement of the forward drive clutch $C_1$ such that drive is not transmitted to the gearing when the transmission is set for Neutral. This prevents gear noise in Neutral and also reduces wear.

We claim:

1. In a motor vehicle having an engine throttle valve control and a shiftable drive ratio selector control, a transmission for providing three forward speed ratios and a reverse drive comprising a casing, an axially spaced input shaft and an output shaft journalled in the front and rear ends respectively of said casing, a casing member arranged intermediate the ends of the casing separating the casing into forward and aft compartments, an intermediate shaft extending axially between and rotatable relative to said input and output shafts and having intermediate portions thereof journalled on the casing intermediate member, first and second clutch means mounted on said intermediate shaft and located in the forward one of said compartments, forward and rear planetary gear sets mounted on said intermediate shaft in side-by-side relationship and located in the aft one of said compartments, each planetary gear set comprising a sun gear, a ring gear and planet pinion gears rotatably mounted on a pinion gear carrier member and meshingly engaged with a sun gear and a ring gear, means drivingly connecting the sun gears of the first and second gear sets for simultaneous rotation, means drivingly connecting the intermediate shaft and the ring gear of the rear gear set, means drivingly connecting the pinion gear carrier of the rear gear set and the ring gear of the forward gear set to the output shaft, a one-way brake device mounted on said casing intermediate member and arranged to anchor the pinion gear carrier of the forward gear set against rotation in a direction reverse to that of the input shaft, a first brake means to anchor the pinion gear carrier of the forward gear set against rotation in either direction, a second brake means to simultaneously anchor said sun gears against rotation, means to cause said first clutch means to connect said input and intermediate shafts, means to cause said second clutch means to connect the input shaft and said sun gears, and means responsive to the degree of throttle valve opening and to the speed of the output shaft to automatically operate said second brake means and said second clutch means to effect automatic changes in forward speed ratio drive through the transmission.

2. In a motor vehicle having a transmission as set forth in claim 1 wherein the drive ratio selector control provides means to operate the first and second brake means to overrule the controls for effecting automatic changes in speed ratio drive.

(References on following page)

References Cited in the file of this patent

UNITED STATES PATENTS

| | | | |
|---|---|---|---|
| 2,518,824 | Simpson | Aug. 15, | 1950 |
| 2,578,450 | Pollard | Dec. 11, | 1951 |
| 2,605,652 | Kelbel | Aug. 5, | 1952 |
| 2,645,135 | Frank | July 14, | 1953 |
| 2,700,312 | Smirl | Jan. 25, | 1955 |
| 2,749,773 | Simpson | June 12, | 1956 |
| 2,770,148 | Wayman | Nov. 13, | 1956 |
| 2,788,678 | Sheppard | Apr. 16, | 1957 |
| 2,826,936 | Simpson | Mar. 18, | 1958 |
| 2,856,794 | Simpson | Oct. 21, | 1958 |

UNITED STATES PATENT OFFICE

CERTIFICATE OF CORRECTION

Patent No. 2,932,990                                                                 April 19, 1960

Bert W. Cartwright et al.

It is hereby certified that error appears in the printed specification of the above numbered patent requiring correction and that the said Letters Patent should read as corrected below.

Column 12, line 31, strike out "axially spaced" and insert the same before "output" in line 32, same column.

Signed and sealed this 18th day of October 1960.

(SEAL)
Attest:

KARL H. AXLINE
Attesting Officer

ROBERT C. WATSON
Commissioner of Patents